June 12, 1945.   W. A. CHAMBERS   2,378,129
MAGNETIC DEVICE
Filed July 13, 1942

Inventor
WILLIAM A. CHAMBERS
By Ralph B. Stewart
Attorney

Patented June 12, 1945

2,378,129

UNITED STATES PATENT OFFICE 2,378,129

MAGNETIC DEVICE

William Arnold Chambers, Ewell, England, assignor to Ronald Trist & Co. Limited, Slough, England Application July 13, 1942, Serial No. 450,773
In Great Britain August 7, 1941

5 Claims. (Cl. 172—284)

This invention relates to magnetic devices for transmitting energy.

For various purposes it is necessary to move a driven member with snap action when a driving member reaches a predetermined position. As a rule the driven member actuates a switch, and a particular example is the actuating mechanism used for controlling the operation of a boiler. Here a float may rock a shaft as the level of the water in the boiler rises and falls, and switches may have to be actuated at predetermined high and low levels. It is desirable that these switches should be actuated positively and with snap action as the float arrives at the one or other level, and that hunting should be avoided, i. e. the switch, once actuated, should not be actuated in the reverse direction until the float has risen or fallen through a specific distance from the position at which the first actuation took place. This invention aims at providing improved magnetic devices for actuating switches in this way and for transmitting energy for other purposes.

An important object of the invention is to employ the interaction of magnetic fields in a novel way to produce snap action.

The invention involves the use of two magnets mounted for relative movement from a position in which the resultant of the forces set up by the interaction of the magnetic fields is in one direction through a neutral position to a position in which the resultant is in the opposite direction. The neutral position is one of unstable equilibrium and the magnets will never remain in it. Each magnet has at least two poles that so co-operate with two poles of the other magnet that in the position of neutral equilibrium a north pole of one magnet exerts on a north pole of the other magnet a repulsive force of the same order of magnitude as that exerted by a south pole of the one magnet on a south pole of the other magnet in the same position. If the maximum effect is to be produced the poles are so disposed that in the neutral position the repulsion of like poles sets up forces of the same order of magnitude as the attraction of unlike poles.

Preferably the magnets are essentially annular and are mounted so that at least one rocks or rotates about an axis coincident with or parallel to its own axis. Only one magnet need be movable, but preferably both are, and then one is a driving magnet and the other a driven magnet. In such a case stops or the equivalent are provided to limit the movement of the driven magnet in each direction. When only one magnet is movable, the movement of that magnet is accelerated as it passes the position of unstable equilibrium.

The preferred form of the invention is illustrated in the accompanying drawing in which.

Figure 1:
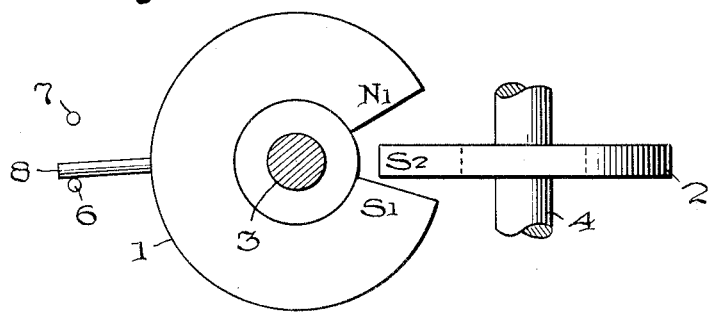
Figure 1 is a plan view of the arrangement.

Referring to the drawing, a pair of annular magnets 1 and 2 are mounted for rotation about their respective axes upon a driven shaft 3 and a driving shaft 4. The two magnets are arranged with their mounting shafts 3 and 4 at right angles to each other and the driving magnet 2 is arranged so that its poles move through the gap of the driven magnet 1. The gap in the driven magnet must be so much wider than the thickness of the driving magnet that the driven magnet 1 can rock between its two limiting positions without having its pole pieces come into contact with the driving magnet 2. Driven magnet 1 is limited in movement between two limiting positions by means of a pair of fixed stop pins 6 and 7 which are engaged by arm 8 carried by magnet 1.

It will be understood that driven shaft 3 may actuate a switch element or any other element which is to be moved with a snap action. Also, driving shaft 4 is moved by any suitable means so that one or the other of the poles of driving magnet 2 will enter the gap of driven magnet 1.

Figure 2:
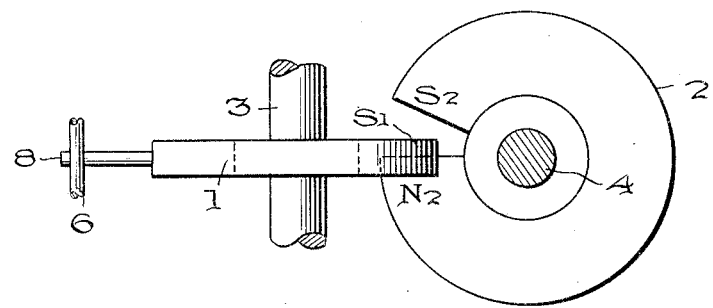
Figure 2 is an elevational view of the arrangement shown in Figure 1.

The operation of the arrangement is as follows: In the position shown in the drawing the north pole N2 of the driving magnet 2 is attracting the south pole S1 of the driven magnet 1 and the latter is tending to move anti-clockwise as shown in Figure 1 but is prevented from doing so by the stop 6. The south pole S2 of the magnet 2 is, of course, also repelling the south pole S1 of the magnet 1, but the distance between the two south poles is less than that between N2 and S1 and the repulsive force is distinctly less than the attractive force. In the same position N1 is attracted by S2 and repelled by N2, and these forces largely balance one another. Accordingly there is a resultant anti-clockwise torque on the magnet 1. If now the driving magnet 2 is rocked anti-clockwise as shown in Figure 2, S2 will come nearer than N2 to S1 so that the torque will reverse and when a critical position is reached the frictional forces will be overcome and the magnet 1 will move clockwise as shown in Figure 1 with snap action until the arm 8 hits the stop 7. The movement is primarily initiated by the repulsion of the two south poles but is completed by the attraction between N1 and S2. When the driving magnet 2 is rocked back again the magnet I will similarly be moved back, but the position at which the movement begins is not the same, that is to say, the driven magnet 1 will not immediately move again even if the driving magnet 2 should begin to rock back immediately the driven magnet 1 has snapped over.

I claim:

1. An energy-transmitting device comprising a ring-shaped driven magnet having a gap between two poles, means for mounting said magnet for movement of the poles thereof generally parallel to the line of said poles, means for limiting the movement of said magnet in opposite directions, a ring-shaped driving magnet, and means for mounting said driving magnet so either pole thereof may be moved into the gap of said first magnet, the axes of said magnets being arranged at right angles to each other.

2. An energy-transmitting device comprising, in combination, a driven magnet having a short gap between the poles thereof, means for mounting said magnet so the poles thereof rotate about a pivotal axis one ahead of the other, a pair of spaced stops for limiting the rotational movement of said driven magnet to less than the length of said gap, a driving magnet having a short gap between the poles thereof, and means for mounting said driving magnet for rotation in a plane substantially at right angles to the plane of rotation of said driven magnet and passing through the gap of said driven magnet, said driving magnet being arranged so the poles thereof move one ahead of the other in its plane of rotation and coact with the poles of the driven magnet to move the driven magnet in one direction when the north pole of the driving magnet is positioned in the plane of rotation of the driven magnet and for moving the driven magnet in the opposite direction when the south pole of the driving magnet is positioned in the plane of rotation of the driven magnet.

3. An energy-transmitting device comprising, in combination, annular driving and driven magnets each having two poles separated by a short gap, means for mounting said driven magnet for rotation about its axis, a pair of spaced stops for limiting the rotational movement of said driven magnet to less than the distance of the gap between the poles thereof, means for mounting said driving magnet for rotation about its axis and in a plane passing through the gap of said driven magnet, the axes of said annular magnets being substantially at right angles to each other, and said driving magnet being positioned so that either pole thereof may be moved into the plane of rotation of said driven magnet closely adjacent the path of movement of the poles of said driven magnet.

4. An energy-transmitting device according to claim 3 wherein said driving magnet is positioned so that either pole thereof may move into the gap between the poles of said driven magnet.

5. An energy transmitting device comprising, in combination, a driving magnet and a driven magnet each having two poles separated by a short gap, means for mounting said driven magnet for movement in a direction generally parallel to the line of its poles, a pair of spaced stops for limiting the movement of said driven magnet in opposite directions to less than the length of the gap thereof, and means for mounting said driving magnet in a plane substantially at right angles to the plane of said driven magnet and for movement of the poles thereof across the plane of said driven magnet and closely adjacent to the path of movement of the poles of said driven magnet, whereby said driven magnet is moved in one direction when one pole of said driving magnet is positioned in the plane of the driven magnet and is moved in the opposite direction when the other pole of the driving magnet is positioned in the plane of the driven magnet.

WILLIAM ARNOLD CHAMBERS.